March 4, 1924.

P. E. NORRIS 1,485,426

MACHINE FOR PASTING STORAGE BATTERY GRIDS

Filed Dec. 8, 1920     4 Sheets-Sheet 1

Paul E. Norris,
INVENTOR,

BY

A. L. Vencill
ATTORNEY.

March 4, 1924. 1,485,426
P. E. NORRIS
MACHINE FOR PASTING STORAGE BATTERY GRIDS
Filed Dec. 8, 1920 4 Sheets-Sheet 2
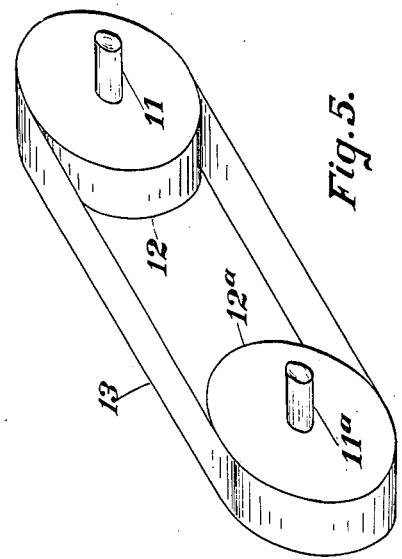
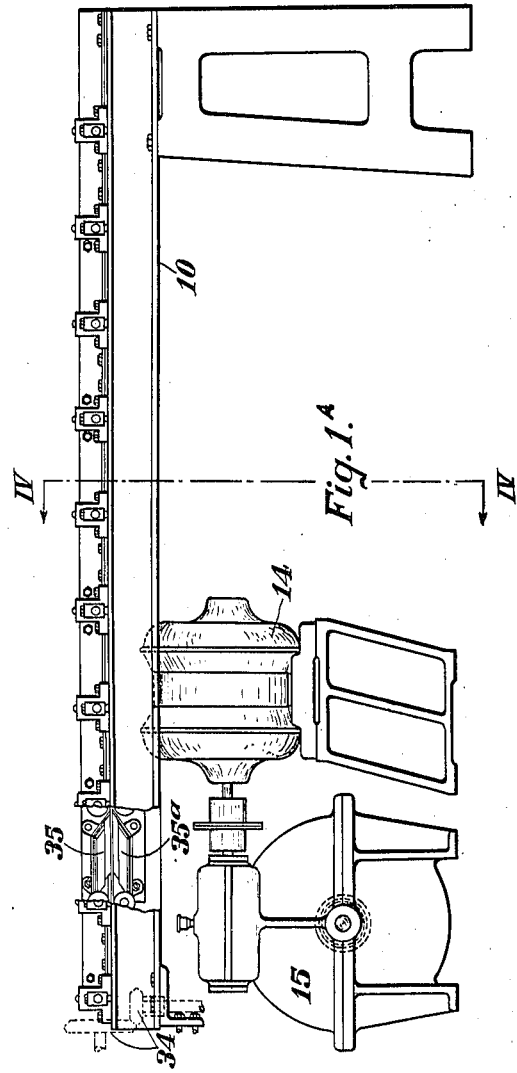
Paul E. Norris, INVENTOR,
BY
A. L. Verrcill ATTORNEY.

March 4, 1924.  1,485,426
P. E. NORRIS
MACHINE FOR PASTING STORAGE BATTERY GRIDS
Filed Dec. 8, 1920  4 Sheets-Sheet 3
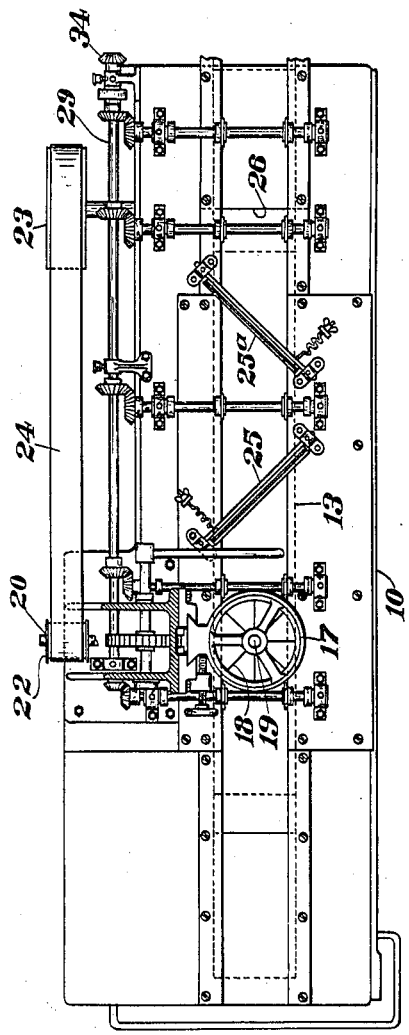
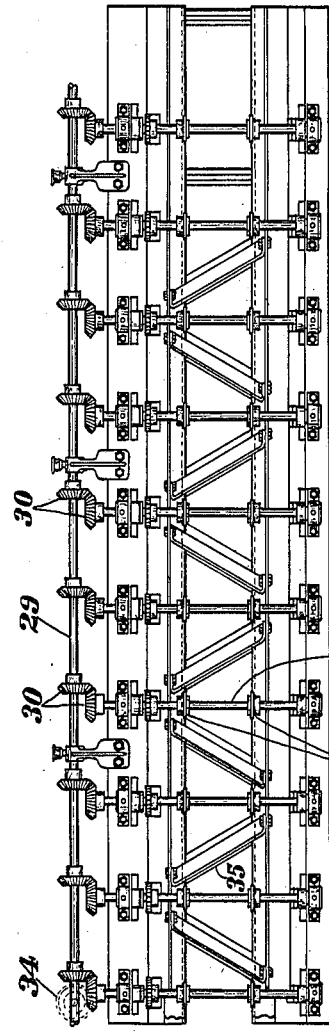
Paul E. Norris,
INVENTOR,
BY
A. L. Vencill
ATTORNEY.

Patented Mar. 4, 1924.                                                     1,485,426

UNITED STATES PATENT OFFICE.

PAUL E. NORRIS, OF WILKINSBURG, PENNSYLVANIA, ASSIGNOR, BY MESNE ASSIGN-
MENTS, TO WESTINGHOUSE UNION BATTERY COMPANY, OF SWISSVALE, PENN-
SYLVANIA, A CORPORATION OF PENNSYLVANIA.

MACHINE FOR PASTING STORAGE-BATTERY GRIDS.

Application filed December 8, 1920. Serial No. 429,269.

*To all whom it may concern:*

Be it known that I, PAUL E. NORRIS, a citizen of the United States, residing at Wilkinsburg, in the county of Allegheny and State of Pennsylvania, have invented certain new and useful Improvements in Machines for Pasting Storage-Battery Grids, of which the following is a specification.

My invention relates to machines for applying paste to storage battery grids. One object of the invention is the provision, in a machine of this character, of a carrier belt having uniform thickness throughout, and in the practice of the invention, this belt is preferably made of a flexible metal such for example as thin steel.

I will describe one form of machine embodying my invention, and will then point out the novel features thereof in claims.

Figure 1:
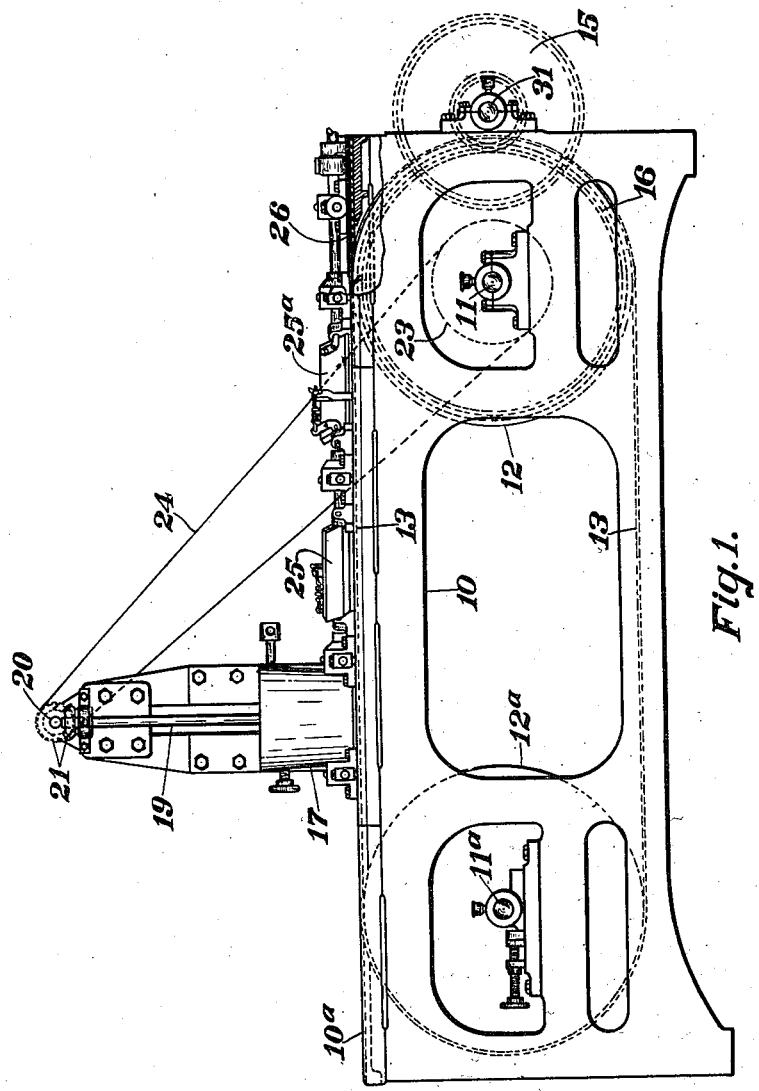
Figure 3:
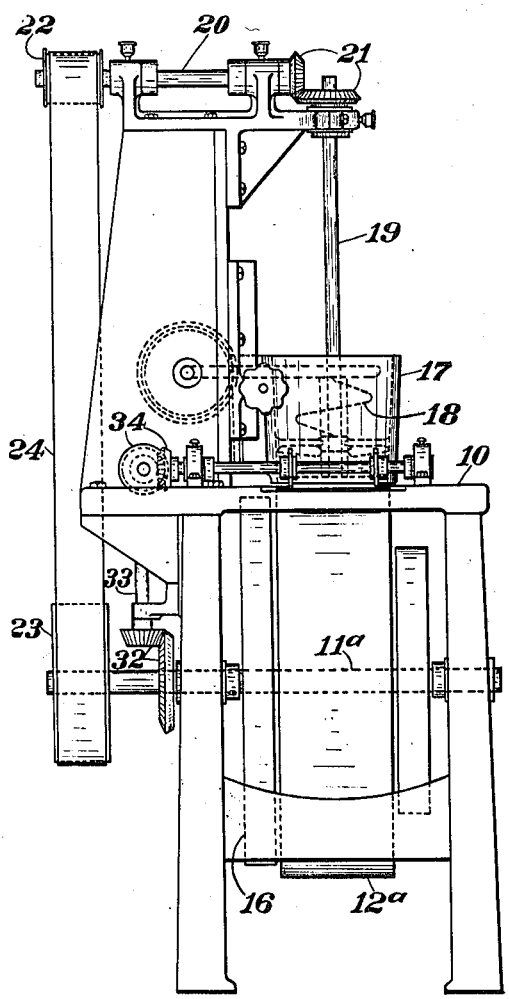
Figure 4:
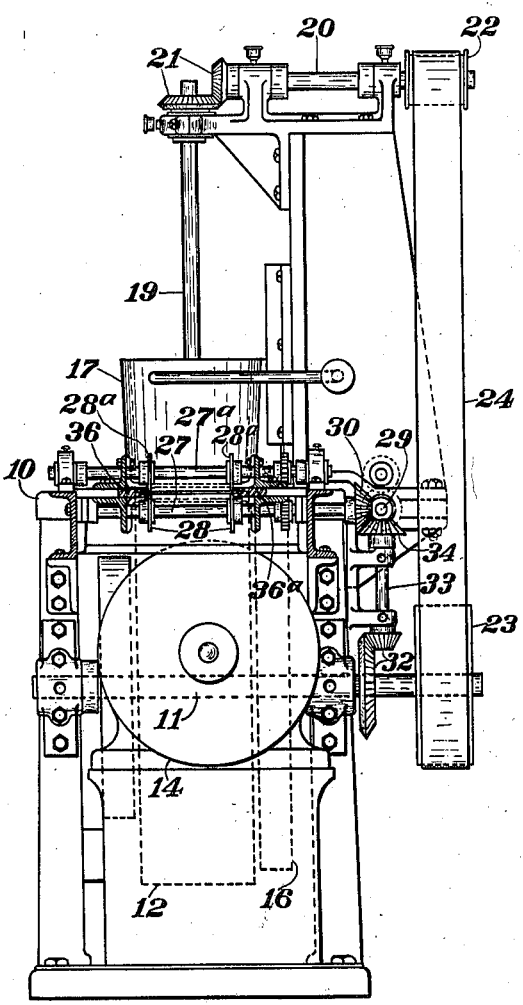

In the accompanying drawings, Figs. 1 and 1$^A$ are views showing in side elevation, partly sectioned, the left half and right half respectively of one form of pasting machine embodying my invention. Figs. 2 and 2$^A$ are top plan views of the left and right hand halves respectively of the machine shown in Fig. 1. Fig. 3 is an end view of the machine shown in Fig. 1, looking at the latter view from the left. Fig. 4 is a vertical sectional view on the line IV—IV of Fig. 1$^A$ looking in the direction indicated by the arrows. Fig. 5 is a detail view showing a carrier belt forming part of the machine shown in the preceding views.

Similar reference characters refer to similar parts in each of the several views.

Referring to the drawings, the machine comprises a suitable framework or supporting structure which is designated in general by the reference character 10. Mounted in suitable bearings in this framework are two transverse shafts 11 and 11$^a$ to which are attached two drums 12 and 12$^a$ respectively. Mounted on these two drums is an endless conveyer or carrier belt 13 which is made of suitable sheet metal, such for example as sheet steel, and the function of which, as hereinafter explained, is to carry the battery grids under the hopper which suppplies the paste or active material.

Means are provided for rotating the drum 12 in clockwise direction as viewed in Fig. 1, thereby causing the upper level of the belt 13 to move to the right. As here shown, this means comprises an electric motor 14 which is connected through suitable reduction gearing 15 with a gear wheel 16 fixed on the drum shaft 11.

The paste or active material is supplied to the grids from a hopper 17 which is supported in suitable manner above the belt 13, and the paste is forced downwardly into the grids by means of a helical or screw-like member 18 located within the hopper and rotatable on a vertical axis. The operation of this member on the paste is similar to the operation of the propelling member in the well known meat grinder. Rotary motion is transmitted to the member 18 by a vertical shaft 19 which is in turn driven from a horizontal shaft 20 through the medium of bevelled gears 21. Shaft 20 is provided with a pulley 22 which is connected by a belt 24 with a pulley 23 on the drum shaft 11, so that rotation of the latter shaft causes rotation of the member 18 in hopper 17.

In the operation of the machine, the grids are slid onto the belt 13 at the left-hand end from a table 10$^a$, and due to the motion of the belt and of auxiliary propellers hereinafter described they are then carried under the hopper 17 where they receive the paste. After emerging from the hopper the plates pass under the scrapers 25 and 25$^a$ which are so adjusted as to scrape off the excess paste and to leave the paste flush with the upper surface of the grid. Further progress of the plates brings them to a take-off shoe 26 having a knife edge which hugs the belt at the point where the belt begins to bend over the drum 12. After the plates are removed from the belt by this shoe, they are carried along to the right hand end of the machine by means of suitable propellers, the plates travelling in slots cut in horizontal guides 36 and 36$^a$ as shown in Fig. 4. During their progress through the machine the plates pass between a number of pairs of smoothers 35, 35$^a$ which serve to insure smoothness of the paste on the grid.

As here shown, each propeller comprises two transverse shafts 27 and 27$^a$, one above the other, the shaft 27 having fixed thereto a pair of spaced wheels 28, and the shaft 27$^a$ having fixed thereto a pair of similarly spaced wheels 28$^a$. The spacing of these wheels is such that they engage the outside frame of the grid as the plate travels through the guides 36 and 36ª. The lower shaft 27 of each propeller is connected by bevelled gears 30 with a longitudinal shaft 29, which, in turn, is driven from a shaft 31 through the medium of bevelled gears 32, a vertical shaft 33, and bevelled gears 34. The shaft 31 is attached to one of the members of the reduction gearing 15.

As I have already stated, the belt 13 is made of flexible sheet metal, preferably steel. This construction has certain advantages, among which are the following:

In a machine of the kind described it is desirable that the carrier belt shall be of uniform thickness and that it shall be capable of running truly over the supporting and driving drums.

Uniform thickness of the belt is desirable for two reasons: First, the lower end of the hopper 17 must be as close to the grids as possible. If the belt varies in thickness, then some of the grids will scrape against the hopper and be injured, or if the hopper is set high enough to prevent such injury then an unnecessary surplus of paste will be deposited on some of the grids. Second, the grids cannot be raised or picked off of the belt, for the reason that the paste will stick to the belt and pull out of the grid. For this reason they must be slid off or sliced off by some device such as the take-off shoe 26. If the thickness of the belt is variable, this shoe cannot be made to hug the belt tightly at all points and in some of the grids the paste will be pulled out in spots. Furthermore, the knife edge of this shoe is likely to cut a belt of leather, rubber or fabric, and so to destroy such belt after only a small amount of use.

It is desirable that the belt be capable of running truly over the drums in order to keep the grids moving in a straight line through the machine. If the belt is not true the grids will tend to stick or catch in the guides 36 and 36ª.

A belt made of flexible steel or other flexible metal is practically uniform in thickness and can be very easily made to run truly over the drums. The take-off shoe can be made to fit the pulley and hug the belt very closely, and will, of course, not wear the belt appreciably.

Although I have here shown and described only one form of pasting machine embodying my invention, it is understood that various changes and modifications may be made therein within the scope of the appended claims without departing from the spirit and scope of my invention.

Having thus described my invention, what I claim is:

1. A storage battery grid pasting machine comprising a hopper for delivering paste to the grids, a carrier belt of flexible metal for carrying the grids under said hopper, and a take off shoe provided with a knife edge for removing the pasted grids from the carrier belt.

2. A storage battery grid pasting machine comprising a table, a hopper disposed above said table for delivering paste to the grids, a carrier belt of flexible metal traveling on said table for carrying the grids under said hopper, and a take off shoe provided with a knife edge for removing the pasted grids from the carrier belt.

In testimony whereof I affix my signature.

PAUL E. NORRIS.